(12) United States Patent
Whaley et al.

(10) Patent No.: US 7,920,794 B1
(45) Date of Patent: Apr. 5, 2011

(54) FREE SPACE OPTICAL COMMUNICATION

(75) Inventors: Gregory J. Whaley, Woodbury, MN (US); Rick C. Stevens, Apple Valley, MN (US); Aaron M. Cordes, Bloomington, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 636 days.

(21) Appl. No.: 11/650,137

(22) Filed: Jan. 5, 2007

(51) Int. Cl.
*H04B 10/00* (2006.01)
*B64C 13/02* (2006.01)

(52) U.S. Cl. ......... 398/131; 398/125; 398/129; 398/122

(58) Field of Classification Search ................ 398/125, 398/112, 129, 131
See application file for complete search history.

(56) References Cited

U.S. PATENT DOCUMENTS

| | | | |
|---|---|---|---|
| 4,775,971 A | 10/1988 | Bergmann | |
| 4,966,447 A | 10/1990 | Huang et al. | |
| 5,062,150 A * | 10/1991 | Swanson et al. | 398/129 |
| 5,260,820 A * | 11/1993 | Bull et al. | 398/125 |
| 5,407,151 A * | 4/1995 | Singhal | 244/76 R |
| 5,870,215 A * | 2/1999 | Milano et al. | 398/108 |
| 6,268,944 B1 * | 7/2001 | Szapiel | 398/129 |
| 6,335,811 B1 | 1/2002 | Sakanaka | |
| 6,347,001 B1 * | 2/2002 | Arnold et al. | 398/122 |
| 6,577,421 B1 * | 6/2003 | Cheng et al. | 398/129 |
| 6,590,685 B1 * | 7/2003 | Mendenhall et al. | 398/121 |
| 6,795,655 B1 * | 9/2004 | Sidorovich et al. | 398/128 |
| 6,834,164 B1 | 12/2004 | Chan | |
| 6,856,741 B2 | 2/2005 | Britz | |
| 6,881,925 B1 * | 4/2005 | Sato et al. | 219/121.73 |
| 6,889,941 B1 * | 5/2005 | McElreath et al. | 244/135 A |
| 6,934,475 B2 * | 8/2005 | Stappaerts | 398/121 |
| 6,960,750 B2 | 11/2005 | Doane | |
| 7,058,307 B2 * | 6/2006 | Sakanaka | 398/119 |
| RE39,397 E | 11/2006 | Wilde et al. | |
| 7,136,585 B2 | 11/2006 | Bloom | |
| 7,292,788 B2 * | 11/2007 | Triebes et al. | 398/122 |
| 7,292,789 B1 * | 11/2007 | Capots et al. | 398/125 |
| 7,319,039 B2 * | 1/2008 | Sullivan | 436/172 |
| 7,399,125 B1 * | 7/2008 | Whaley et al. | 385/92 |
| 7,406,263 B2 * | 7/2008 | Graves et al. | 398/119 |
| 7,424,225 B1 * | 9/2008 | Elliott | 398/115 |
| 2002/0122230 A1 * | 9/2002 | Izadpanah et al. | 359/145 |
| 2004/0151504 A1 * | 8/2004 | Triebes et al. | 398/131 |
| 2004/0156638 A1 * | 8/2004 | Graves et al. | 398/129 |
| 2004/0208272 A1 | 10/2004 | Moursund et al. | |

(Continued)

OTHER PUBLICATIONS

Harris et al. "Alignment and tracking of a free-space optical communications link to a UAV", The 24th Digital Avionics Systems Conference, 2005. DASC 2005. vol. 1.*

(Continued)

*Primary Examiner* — Ken N Vanderpuye
*Assistant Examiner* — Danny W Leung
(74) *Attorney, Agent, or Firm* — Brooks, Cameron & Huebsch, PLLC

(57) ABSTRACT

Free space optical communication systems, methods, and apparatuses are provided. A system embodiment includes a photodetector for receiving a beacon signal transmitted from a ground communication apparatus, a light source for emitting a light beam toward a source of the beacon signal, where the light beam includes a signal to be transmitted, and a high speed tracking actuator coupled to the light source for moving the light source to maintain the light beam in a direction toward the source of the beacon signal transmitted from the ground communication apparatus.

22 Claims, 4 Drawing Sheets

U.S. PATENT DOCUMENTS

| | | |
|---|---|---|
| 2005/0069325 A1* | 3/2005 | Cicchiello et al. ............ 398/122 |
| 2006/0140644 A1 | 6/2006 | Paolella |
| 2006/0209766 A1 | 9/2006 | Britz et al. |
| 2007/0183783 A1* | 8/2007 | Lam .............................. 398/123 |
| 2007/0223929 A1* | 9/2007 | Graves ......................... 398/122 |
| 2008/0075467 A1* | 3/2008 | Mickley et al. ............... 398/131 |
| 2008/0118247 A1* | 5/2008 | Drago et al. .................. 398/122 |
| 2009/0002664 A1* | 1/2009 | Tanitsu .......................... 355/67 |
| 2009/0028573 A1* | 1/2009 | Krill et al. ..................... 398/125 |
| 2009/0162071 A1* | 6/2009 | Refai et al. .................... 398/131 |

OTHER PUBLICATIONS

Free-space optics: telecom without the fiber, OpticsReport, Jun. 15, 2002 http://www.opticsreport.com/content/printable.php?id=1012& command=article.

* cited by examiner

FREE SPACE OPTICAL COMMUNICATION

FIELD OF THE DISCLOSURE

The present disclosure generally relates to free space optics. And, in particular, the present disclosure relates to free space optics such as free space optical communication systems, and other such fields.

BACKGROUND

Free space optics (FSO) is a telecommunication technology that uses light propagating in free space to transmit data between two points. The technology can be useful where the physical connection of the transmit and receive locations is difficult. For example, in cities, the laying of fiber optic cables can be expensive and, in some instances, impractical based upon the infrastructure already built.

Free space optics can also be used to communicate between spacecraft, since outside of the atmosphere there is little to distort the signal. In some instances, the optical links use infrared laser light. Communication is also possible using light emitting diodes (LEDs) or other light sources, in some systems.

The beams of light in FSO systems are transmitted by light focused on receivers. These receivers can, for example, be telescopic lenses able to collect the photon stream and transmit digital data.

The data can be any item of information that can be transmitted on a communication system. For example, types of data can include one or more application programs (i.e., sets of executable instructions), files to be executed by such programs, or data, among other types. Files to be executed can, for example, take the form of Internet messages, video images, radio signals, or computer files, among other items.

SUMMARY

Embodiments of the present disclosure provide various methods, apparatuses, and systems for free space optical communication. In various embodiments, an asymmetric free space optical communication system can include a photodetector for receiving a beacon signal transmitted from a ground communication apparatus and a light source for emitting a light beam toward a source of the beacon signal, where the light beam includes a signal to be transmitted.

The communication system can also include a number of actuators for moving the light source to maintain the light beam in a direction toward the source of the beacon signal transmitted from the ground communication apparatus. For example, embodiments can utilize a high speed tracking actuator coupled to a light source. Such embodiments can reduce the number of components used in a free space optical communication system, among other benefits.

In various embodiments, an actuator can be a servo actuator. For example, the servo actuator can be used as a high speed tracking actuator in various embodiments. In some embodiments, the servo actuator can be movable in two dimensions.

The light source can be an optical fiber, for example, positioned adjacent an optical telescope at a focal plane of the optical telescope. In some embodiments, the optical telescope can include a beam splitter for directing the incoming beacon signal to the photodetector.

In some embodiments, a free space optical communication apparatus includes an optical telescope, where the optical telescope has an optical fiber positioned adjacent a focal plane of the optical telescope for emitting a light beam including a signal to be transmitted and a receive optical path for accepting and directing a beacon signal to a photodetector. Apparatus embodiments can include a servo actuator movable in two dimensions coupled to the optical fiber for moving the optical fiber in the focal plane to point the light beam in a number of directions. A control system for driving the servo actuator based on the beacon signal can be used to maintain the light beam in a direction toward the source of the beacon signal.

In various embodiments, the free space optical communication apparatus can be coupled to an unmanned aerial vehicle (UAV). In addition, the free space optical communication apparatus can include a gimbal tracking actuator to move the apparatus. For example, in various embodiments the gimbal tracking actuator can move the apparatus in two dimensions.

Various method embodiments discussed herein for providing free space optical communication include receiving an incoming beacon signal from a ground communication apparatus, moving a transmitting light source adjacent an optical telescope in an unmanned aerial vehicle based on an orientation of the incoming beacon signal received, and transmitting a light beam directed toward a source of the incoming beacon signal from the transmitting light source, where the light beam includes a signal to be transmitted.

Some method embodiments include focusing the incoming beacon signal at a photodetector, where the photodetector senses the position of the incoming beacon signal received, locating a position of the transmitting light source, and generating correction information, where the correction information is a difference between the position of the transmitting light source and the position of the beacon signal received. The transmitting light source can be moved based on the correction information, which can provide correction information, for example, in at least two dimensions.

In various embodiments, a method can include moving the light source, beam splitter, and photodetector in unison. Methods can include generating correction information, where the correction information is a difference between a predetermined reference position and the position of the beacon signal received. Moving the optical telescope and/or the light source can then, for example, be based on the correction information.

The functions discussed above can be accomplished, for example, by logic circuitry and/or by having a processor and memory within, attached to, or in communication with the free space optical apparatus or system. For instance, computer executable instructions can be provided in memory and executable by the processor to communicate with the actuators and/or optical telescope to obtain information about the emission and/or receipt of a light wave. Electronic circuits can be utilized to accomplish such functions instead of or in addition to computer executable instructions. These and other advantages of the various embodiments of the present disclosure will become evident upon reading the disclosure.

DETAILED DESCRIPTION

Figure 1:
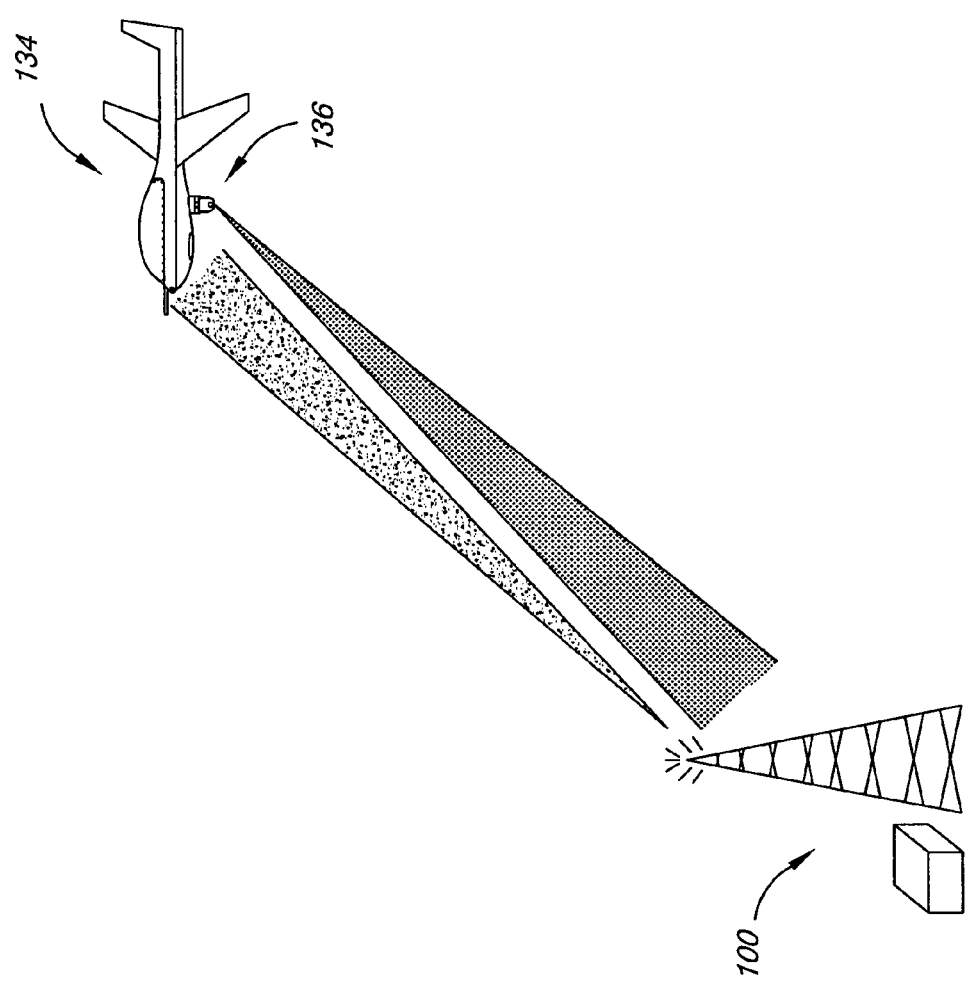
FIG. 1 is an illustration of an embodiment of a free space optical communication system according to the present disclosure.

As discussed herein, free space optical communication can been used in applications where the size, weight, and/or tracking speed of the apparatus is of relatively low concern. For example, such characteristics can be of low concern in some communication applications, for example, between buildings. However, in some applications, the size, weight, and/or tracking speed of a free space optical communication apparatus can be more important.

For example, the use of a free space optical (FSO) communication system between an aircraft, for example, an unmanned aerial vehicle (UAV) and a ground communication apparatus can be beneficial for the high-speed transmission of data. Some UAVs can have a relatively small size as compared to other aircrafts, and in some instances, size and/or weight may be considerations when determining if a FSO communication system is usable, or in selecting a type of FSO communication system or apparatus. Embodiments of the present disclosure can be utilized in various environments, such as the use with aerial, land, water, space vehicles and/or between buildings or other structures.

In addition, in some environments, such as the environments experienced by some UAV systems, considerably more movement can be experienced as compared to many environments where a FSO communication system is used between buildings. Further, the movement can be quicker, it can be in more directions, and/or it can be more unpredictable, among other qualities. Embodiments of the present disclosure include free space optics communication systems, apparatuses, and methods that can provide high-speed transmission of data given the aforementioned considerations, among others.

A free space optical communication system that can be used between two buildings, among other locations, can include two FSO apparatuses that can receive and transmit high speed data signals as well as track the apparatus from which the data is being sent, for example, through the use of a beacon signal.

Such systems can include a first FSO apparatus in a first position and a second FSO apparatus in a second position, such that the apparatuses can send and receive information between them. Such FSO apparatuses can include a light transmission/reception lens component and a movable mirror. In such apparatuses, a data signal can be sent from the first FSO apparatus to the second FSO apparatus in the form of a light beam from a light emitting element. For example, the light beam can be sent from the light source toward the movable mirror, where the movable mirror can direct the signal through free space (e.g., the atmosphere) to the second FSO apparatus.

In some instances, a main signal and a pilot signal can be sent from the first FSO apparatus and received by the second FSO apparatus together. The main signal can contain the data to be transmitted using the free space optical link, while the pilot signal from a pilot signal generator can be used by the second FSO apparatus to track the position of the incoming main signal.

The main signal to be transmitted can be amplified by an amplifier, and can be multiplexed with the pilot signal from the pilot signal generator by a multiplexer. The main signal can be converted into an optical signal by the light source. The output light coming from the light source can be transmitted through a transmission optical component and a beam splitter. The main signal light can be reflected by the movable mirror, and can be output from the transmission/reception lens toward the second FSO apparatus in the form of a light beam.

In addition, the first FSO apparatus can receive a data signal and track the position of the received data signal from the second FSO apparatus so as to provide the optical link when small changes in position occur due to, for example, building sway, vehicle movement, wind, temperature changes, and/or rain. A received light beam coming from the second FSO apparatus can enter the transmission/reception lens 100, be reflected by the movable mirror, and enter the beam splitter. In some instances, the beam splitter can be a polarization beam splitter, where the beam splitter can reflect light of a certain polarization while transmitting light of a different polarization.

In such embodiments, since the received light beam can be polarized, it can be reflected by the beam splitter, and travel in the direction of a beam splitting mirror. The received light beam can be split into two directions by the beam splitting mirror. One light beam can be reflected by the beam splitting mirror, and can be focused on a main signal photodetector.

Another light beam can be transmitted through the beam splitting mirror, and can be focused on a photodetector. In various embodiments, the photodetector can detect the position at which the light is detected by the photodetector. For example, the photodetector can, in some embodiments, be a 4-split photodetector, where the photodetector surface is split into four (4) quadrants to measure the light output in each quadrant to determine the position of the focused light beam, among other types of photodetectors that can detect position.

The main signal received can be converted into an electrical signal by the main signal photodetector, and the electrical signal can be amplified by a second amplifier. The amplified signal can be output as a reception signal from an output terminal. In some instances, the second amplifier can receive a signal fed back from a detecting circuit to attain automatic gain control.

With respect to the 4-split photodetector, an incoming light beam can be transmitted through the beam splitting mirror and focused on the 4-split photodetector. A focused beam spot can be formed on one or more of the photodetection portions of the 4-split photodetector, and the outputs from these photodetection portions can be output to a control circuit after being respectively amplified. The control circuit can send drive signals to movable mirror drivers on the basis of the signals from the four detection portions to drive the movable mirror, in order to attempt to focus the beam spot position at the center of the 4-split photodetector and/or the outputs from the four detection portions can become equal to each other.

Since the positions of the light source, photodetector, and main signal photodetector can be adjusted in advance to agree with each other on an optical axis, when the beam spot is formed at the center of the photodetector, the light beam can also be focused at the central portion of the main signal photodetector. In such a manner, the transmission light beam originating from the light source can be normally output in the direction of the second FSO apparatus.

In this way, even when the angle of the apparatus has changed due to an external force, the tracking functionality effects, by moving, the movable mirror to form the beam spot at the center of the photodetector, thus maintaining a communication state without deviation of the light beam from the direction of the second FSO apparatus.

However, in some instances, the beam splitting mirror for splitting the received light beam and the photodetector, main signal photodetector, and/or light source can require precise positional adjustment. As a result, the optical system and the tracking functionality can be complicated, and adjustments upon assembly become hard. In addition, the transmitter can include the pilot signal generator and multiplexer, and the receiver can include amplifiers corresponding to the photo-detection portions of the, in some instances, 4-split photodetector. From this, the tracking functionality provided by such structures can increase the expense of the apparatus as well as the weight and size.

Embodiments of the present disclosure will now be described in relation to the accompanying drawings, which will at least assist in illustrating the various features of the various embodiments. In the Figures, the first digit of a reference number refers to the Figure in which it is used, while the remaining two digits of the reference number refer to the same or equivalent parts of embodiment(s) of the present disclosure used throughout the several figures of the drawing. The scaling of the figures does not represent precise dimensions and/or dimensional ratios of the various elements illustrated herein.

FIG. 1 is an illustration of an embodiment of a free space optical communication system according to the present disclosure. FIG. 1 illustrates a ground communication apparatus 100 and a free space optical communication apparatus 136 mounted on an unmanned aerial vehicle (UAV) 134.

In some embodiments, the ground communication apparatus 100 can be a stationary free space optical communication apparatus that can receive high speed data transmissions and also transmit a beacon signal. In addition, the ground communication apparatus 100 can, in some instances, be mounted to an air field tower, where the tower and the ground communication apparatus are relatively permanent. In some embodiments, the ground communication apparatus 100 can be portable, so that the ground communication apparatus 100 can be transported to a location and can receive data transmissions from a free space optical communication apparatus 136 in and/or around the location. For example, the ground communication apparatus 100 can be mounted to an automobile vehicle, and a UAV 134 can be sent to collect video images of the area around the vehicle.

In some embodiments, the beacon signal can be received by the free space optical communication apparatus 136 mounted on the UAV 134. The beacon signal can be received by the free space optical communication apparatus 136 and used to track the ground communication apparatus 100, as described further herein.

Figure 2:
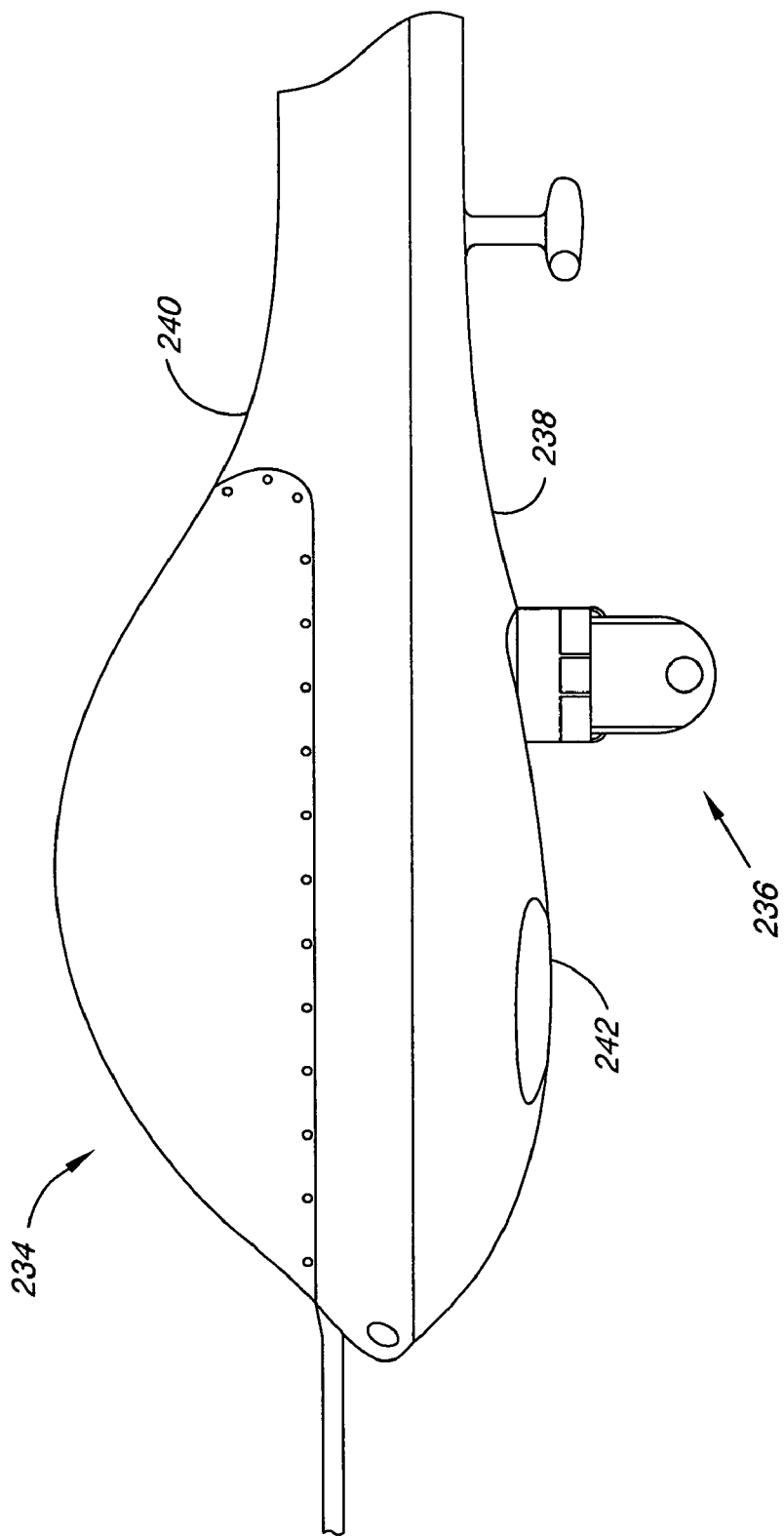
FIG. 2 is an illustration of an unmanned aerial vehicle (UAV) having a free space optical communication apparatus in accordance with an embodiment of the present disclosure.

FIG. 2 is an illustration of an unmanned aerial vehicle (UAV) having a free space optical communication apparatus in accordance with an embodiment of the present disclosure. As illustrated, the UAV 234 is relatively small as compared to a spacecraft or other similar sized aircraft. Examples of UAVs include a Predator drone, a Global Hawk, or various other UAVs. In addition, embodiments of the present disclosure can be implemented on other types of manned and unmanned vehicles including ground vehicles (e.g., military vehicles or automobiles) and various manned aerial vehicles such as manned planes, space shuttles, air balloons, etc.

In some embodiments, the UAV 234 can have a wing span of, for example, three (3) meters (m). The size of the UAV 234 can make the use of compact and/or light weight terminal hardware beneficial. In some embodiments, the free space optical communication apparatus 236 according to the present disclosure can provide for high speed transmission of data from, for example, the UAV 234 to a ground communication apparatus. In some instances, the high speed transmission of data can include high definition video image streaming.

In some embodiments, the UAV 234 can include a number of cameras. The cameras can be any suitable type of camera. Suitable cameras include one or more mega-pixel digital imagers or other cameras capable of providing digital image data or video image data. In FIG. 2, the element 242 identifies the general location of the number of cameras in the embodiment illustrated. In some embodiments, the cameras can be communicate with a free space optical communication apparatus 236 for transmitting the digital image data or video image data captured by the cameras. In various embodiments, other types of information that are to be transmitted from UAV 234 to a ground location can be sent via the free space optical communication apparatus 236.

In some embodiments, the free space optical communication apparatus 236 can be mounted to the UAV 234 on a lower surface 238 of the UAV 234. The free space optical communication apparatus 236 can also be mounted to the UAV in other locations including the top surface 240 of the UAV 234, or inside the UAV 234.

In the embodiment of FIG. 2, the free space optical communication apparatus 236 can be a gimbaled apparatus. Movable apparatuses can be of various types and can have many functions where beam pointing stabilization would be helpful.

As used herein, a gimbaled apparatus refers to an apparatus that is capable of rotating in more than one dimension. In some embodiments, for example, the free space optical communication apparatus 236 can rotate in two dimensions. The free space optical communication apparatus 236 illustrated in FIG. 2 includes a number of components described in more detail herein.

Figure 3:
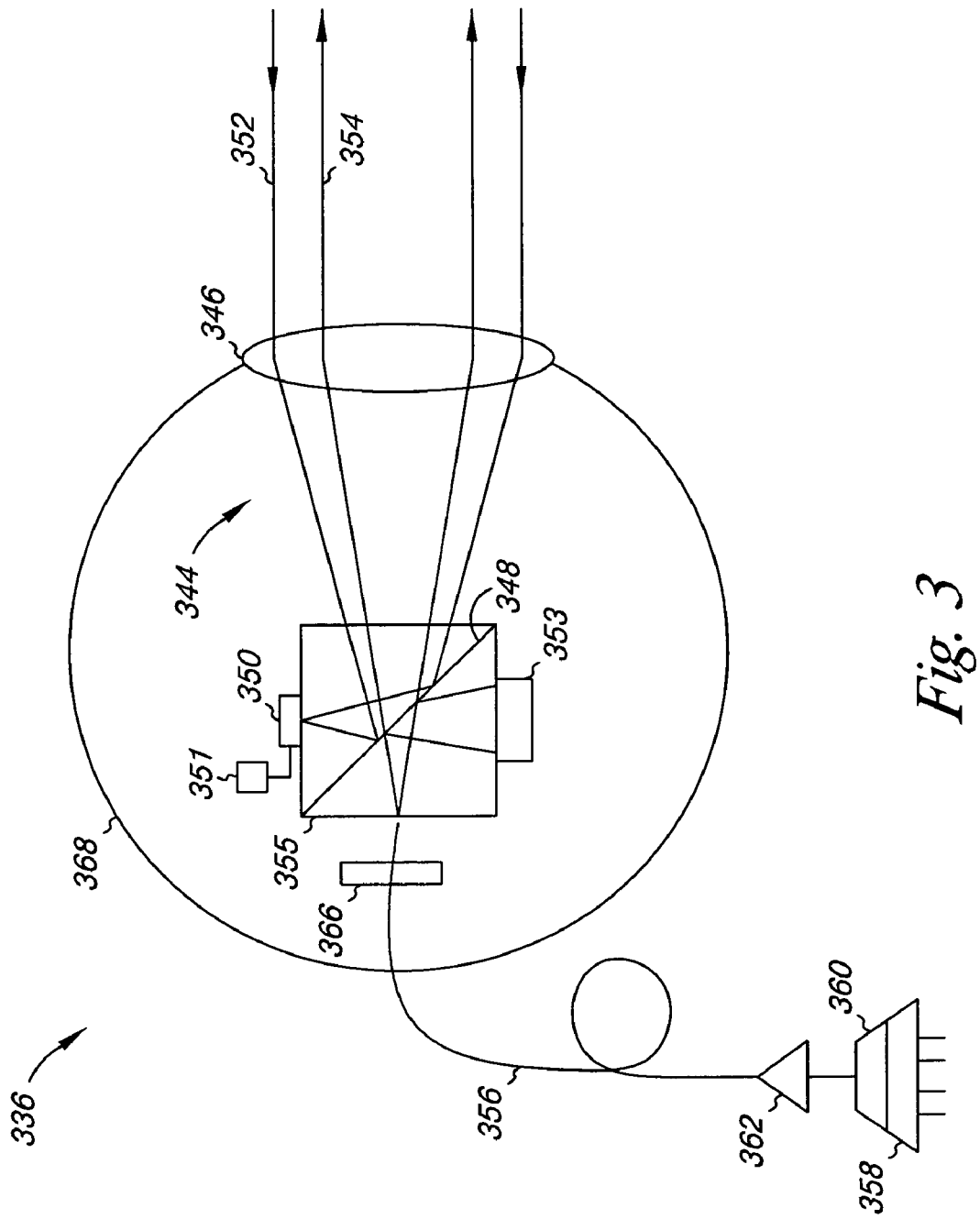
FIG. 3 is an illustration of an embodiment of a free space optical communication apparatus according to the present disclosure.

FIG. 3 is an illustration of an embodiment of a free space optical communication apparatus according to the present disclosure. As shown in FIG. 3, in some embodiments, the free space optical communication apparatus 336 can be asymmetric. In such embodiments, the apparatus 336 can transmit optical data (e.g., a high speed transmission), and can receive an incoming beacon signal, but the apparatus may not receive other optical data.

In some embodiments, the incoming beacon signal can contain data transmitted from the ground communication apparatus to the apparatus 336. In such embodiments, the rate of transmission can be slow as compared to the rate of transmission of the optical data being sent from the apparatus 336 to the ground communication apparatus due to the relatively small size of the lens included in the apparatus 336, as discussed herein.

As illustrated in the embodiment of FIG. 3, the free space optical communication apparatus 336 can include an optical telescope 344 for concentrating the beacon signal received from a ground communication apparatus. The optical telescope 344 can include a lens 346, a beam splitter 348, and a photodetector 350, among other components, as discussed herein.

In some embodiments, the free space optical communication apparatus 336 includes a light source 356 for emitting a light beam 354, where the light beam 354 includes a signal to be transmitted (e.g., an outgoing transmission signal). As illustrated in FIG. 3, the light source 356 can be positioned adjacent the optical telescope 344 at a focal plane 355 of the optical telescope 344. As used herein, the "focal plane" of the optical telescope refers to a location where the outgoing light beam originates from and where incoming signal beams would converge to a signal point but for being deflected by a beam splitter. In some embodiments, the light source 356 can be an optical fiber, for example, a single mode or multimode optical fiber. In addition, in some embodiments, the optical fiber can be terminated with a glass window and positioned adjacent the focal plane of the optical telescope 344.

As discussed herein, the free space optical communication apparatus 336 can be mounted to a UAV where the use of compact and/or light weight hardware can be beneficial. In such embodiments, the free space optical communication apparatus 336 can include the ability to point the light beam 354 toward a ground communication apparatus and the ability to track the ground communication apparatus with sufficient performance to provide an optical link while the UAV is in motion. One way to provide such performance of the free space optical communication apparatus can be to limit the mass of the pointing and tracking components which can have rapid movement.

In some embodiments, the light source 356 can be coupled to a tracking actuator 366 (e.g., a high speed tracking actuator) that can move the light source 356 adjacent to the optical telescope 344 in the focal plane 355 in, for example, two-dimensions. In some embodiments, the high speed tracking actuator 366 can be a servo actuator on wire flexures. By moving the light source 356, the outgoing light beam 354 can point in varying directions.

In such embodiments, by moving a lightweight light source 356 (e.g., an optical fiber), the high speed tracking actuator 366 can move more quickly as compared to when the actuator would have to move an entire optical telescope 344 and/or one or more mirrors. In some embodiments, such movement can also use less power and/or allow for less wear and tear on the movable parts of the apparatus 336. In addition, in such embodiments, by moving the light source 356, the beam splitter 348 and photodetector 350 can be stationary with respect to the optical telescope 344.

Embodiments of the free space optical communication apparatus 336 can include an electrical multiplexer 358 to drive a laser transmitter 360 as input to an optical amplifier 362 to connect an optical signal through the light source 356 to the optical telescope 344. For example, an electrical multiplexer 358 can accept multiple independent data signals and combine them into a single signal to modulate the laser transmitter 360. In some embodiments, the laser transmitter 360 can be a laser diode. In various embodiments, the optical amplifier 362 can be an erbium doped fiber amplifier (EDFA).

In some embodiments, the optical amplifier 362 can receive the optical signal from the laser transmitter 360 and can provide an amplified optical signal at a desired power level to the light source 356 (e.g., optical fiber). As discussed herein, the light source 356 can be an optical fiber, for example, a single mode optical fiber that can deliver the amplified optical signal from the optical amplifier 362 to the optical telescope 344. The optical telescope 344 can propagate the optical signal through free space to a ground communication apparatus.

In some embodiments, optical telescope 344 can include a lens 346, for example, a glass lens 346, used to bend or refract light. For example, the lens 346 can refract an incoming beacon signal 352 and an outgoing transmit signal 354. In some embodiments, the lens 346 can be convex (i.e., becoming thinner toward its edges), so that the lens 346 can bend light at the edge of the lens 346 to a greater angle than light coming through the center. Convex lenses can be utilized in some embodiments, for example, to converge all of the incoming signals to a focal point.

As discussed herein, the free space optical communication apparatus 336 can be asymmetric. Since a free space optical communication apparatus 336 uses an aperture, or lens 346, of a certain size to collect a certain amount of light, a lens 336 can have an appropriate size to receive high speed optical data. In such embodiments where the free space optical communication apparatus 336 does not receive high speed optical data, however, the lens 336 can be similarly appropriately sized. For example, a lens 336 can have a 2.54 centimeter (cm) (one inch) diameter, which would be suitable to transmit high speed optical data, while a substantially larger aperture, for example ten (10) cm would be suitable to transmit and receive high speed optical data. However, the embodiments of this disclosure are not limited to such sizes.

In the embodiment illustrated in FIG. 3, the incoming beacon signal 352 does not converge to a focus on the optical axis due to the presence of the beam splitter 348. In some embodiments, the beam splitter 348 can be a dichroic prism that can split light into two beams of differing wavelength. In such embodiments, the beam splitter 348 can be constructed of one or more glass prisms with dichroic optical coatings that can selectively reflect or transmit light depending on the light's wavelength. That is, certain surfaces within the prism can act as a dichroic filter that can split light into two beams of differing wavelengths.

In some embodiments, the beam splitter 348 can selectively reflect an incoming beacon signal 352 toward a photodetector 350 while passing an outgoing light beam 354 (e.g., transmit signal). In various embodiments, the incoming beacon signal 352 and the light beam 354 can be sent from their respective sources at predetermined wavelengths.

For example, the incoming beacon signal 352 can be sent from a ground communication apparatus at a wavelength of approximately eight hundred fifty (850) nanometers (nm) and the outgoing light beam 354 can be sent from the light source 356 in the free space communication apparatus 336 at a wavelength of approximately one thousand five hundred fifty (1550) nm. It may be that, in some embodiments, the light utilized for one or both signals is not visible light (i.e., not visible to the unaided human eye).

In some embodiments, the beam splitter 348 can reflect the incoming beacon signal 352 toward a photodetector 350, as discussed herein. In some embodiments, the photodetector 350 can be a silicon (Si) photodetector or an indium gallium arsenide (InGaAs) photodetector. In some embodiments, a photodetector can be selected that does not sense wavelengths that can be used for the outgoing light beam 354, or transmission signal (e.g., one thousand three hundred ten (1310) nm and one thousand five hundred fifty (1550) nm). This selection can reduce or prevent the photodetector 350 from sensing such light which may reduce or eliminate error from such light in ground communication tracking, in some embodiments.

In addition, in some embodiments, a sensor 353 can be used to track the position of the light source 356 adjacent to the optical telescope as it is moved by the tracking actuator 366, as discussed herein. The sensor 353 can, for example, be an InGaAs sensor with an imaging lens. In some embodiments, the photodetector 350 and the sensor 353 can be in communication with a control component 351. The control component 351 can calculate the position of the incoming beacon signal 352 with respect to the position of the light source 356, from the photodetector 350 and the sensor 353, respectively. Also, based on the direction of a shift between both positions and/or the amount of the shift, the control component 351, or processor/logic associated therewith, can calculate correction information for controlling the movement of the tracking actuator 366, and thus the outgoing light beam 354, based on the incoming beacon signal 352 position sensed by the photodetector 350 and communicated to the control component 351.

In some embodiments, the correction information is the difference between the position of the light source 356 and the position of the incoming beacon signal 352. In addition, the correction information can provide correction information for at least two dimensions.

In some embodiments, the correction information can be used to drive the tracking actuator 366 so that the light source 356 points in a direction where the light beam 354 and the incoming beacon signal 352 have optical axes that are parallel to or aligned with one another. Since the photodetector 350 can be included in the optical telescope 344, proper pointing of the light beam 354 at the ground communication apparatus can be maintained, even in the presence of motion and vibration.

In some embodiments, the tracking actuator 366 can be used for high speed and/or small angle beam tracking. In addition, as discussed herein, the free space optical communication apparatus 336 can be included in a gimbal tracking actuator 368 for pointing the optical telescope 344 in the general direction of the ground communication apparatus. In some embodiments, the gimbal tracking actuator 368 can be a low speed gimbal tracking actuator 368 movable in two dimensions. In some embodiments, information from the photodetector 350 can be used to control the movement of the gimbal tracking actuator 368 in addition to the high speed tracking actuator 366.

In some embodiments, the free space optical communication apparatus 336 can include a dedicated two-way radio frequency (RF) link from the ground communication apparatus to the apparatus 336. A RF link can, for example, maintain a functional communication link between the apparatus 336 and the ground communication apparatus by providing for uplink data transfer from the ground communication apparatus to the apparatus 336.

In some embodiments, the RF link can be used when the free space optical link is interrupted, such as through influence of turbulence in the atmosphere, or other impediments such as fog, rain, and/or dust. In addition, in some embodiments, the RF link can be used to direct a UAV, for example, back to a position where a last free space optical communication was transmitted. Such embodiments can provide such functionality, for example, through executable instructions and/or logic circuitry and information regarding the last known signal position.

Figure 4:
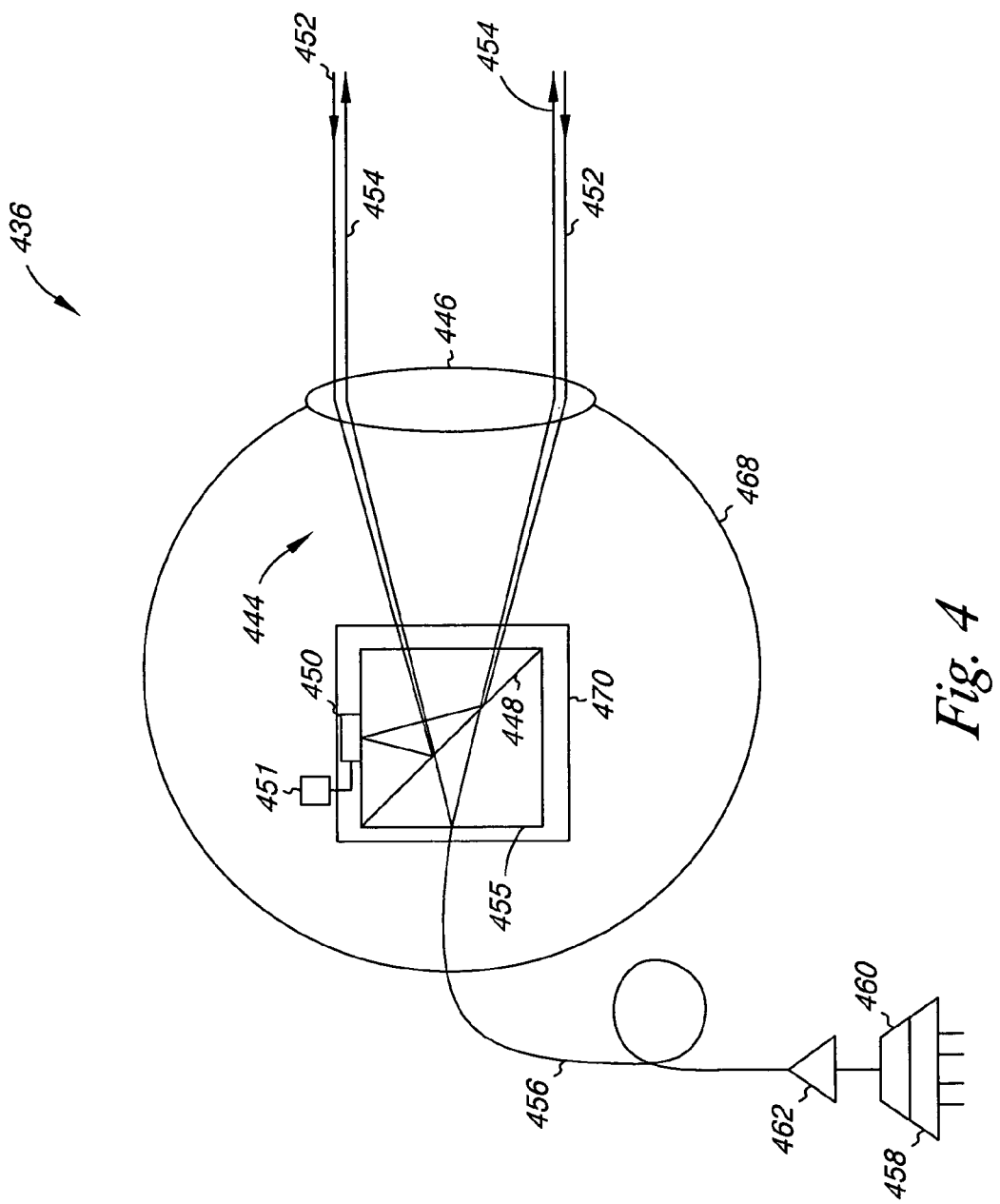
FIG. 4 is an illustration of another embodiment of a free space optical communication apparatus according to the present disclosure.

FIG. 4 is an illustration of an embodiment of a free space optical communication apparatus according to the present disclosure. As shown in the embodiment of FIG. 4, the free space optical communication apparatus 436 can be asymmetric, transmitting optical data, receiving an incoming beacon signal 452, but not receiving other optical data transmissions. In some such embodiments, the apparatus 436 can receive optical data transmissions at a slow rate as compared to the rate at which the apparatus 436 can transmit data to a ground communication apparatus, as discussed herein.

In some embodiments, the free space optical communication apparatus 436 can include an optical telescope 444, where the optical telescope 444 can include a lens 446, a beam splitter 448, and a photodetector 450, as discussed herein. In addition, the free space optical communication apparatus 436 can include a light source 456 for emitting a light beam 454, where the light beam 454, for example, includes a signal to be transmitted (e.g., an outgoing transmission signal).

In the embodiment illustrated in FIG. 4, the light source 456 can be positioned adjacent the focal plane 455 of the optical telescope 444. In some embodiments, the light source 456 can be an optical fiber, for example, a single mode optical fiber.

In some embodiments, the light source 456, the beam splitter 448, and the photodetector 450 can be coupled to a tracking servo actuator 470 tht can move each in the focal plane 455. By moving the light source 456, the beam splitter 446, and the photodetector 450 in unison with a servo actuator 470 (e.g., a high speed actuator), the direction of the outgoing light beam 454 optical path can be moved. For example, in some embodiments, the outgoing light beam 454 and the incoming beacon signal 452 can be aligned.

In such embodiments, a photodetector 450 that can determine position can be used to track the position of the incoming beacon signal 452 with respect to a predetermined reference position. Also, based on the direction of a shift between both positions and/or the amount of the shift, the photodetector 450 can calculate correction information for controlling the movement of the servo actuator 470, and thus the outgoing light beam 454. In some embodiments, the correction information can, for example, be the difference between the predetermined reference position and the position of the incoming beacon signal 452 received. In addition, the correction information can provide correction information for two or more dimensions in various embodiments.

In some embodiments, the photodetector 450 can be in communication with a control component 451 to calculate the correction information for controlling the movement of the high speed tracking actuator 470 based on the position of the beacon signal 452 sensed by the photodetector 450. Such movement can be accomplished, for example, by calculating an amount and a direction of movement with a processor and/or logic circuitry based upon the one or more sensed signal positions and communicating the movement to the high speed and/or low speed actuators. Such movement can, for instance, be provided as instructions that are executed by the processor and/or logic circuitry to actuate the one or more actuators, in some embodiments.

In some embodiments, the correction information can be used to drive the servo actuator 470 to move the beam splitter 448, light source 456, and the photodetector 450 in unison to attempt to match the incoming beacon signal 452 position with the predetermined reference position. In this way, since the light source 456 is moved generally in unison with the beam splitter 448 and photodetector 450, the incoming beacon signal 452 and the light beam 454 can have optical axes that substantially match one another. In addition, since the light source 456 is moved with the beam splitter 448 and photodetector 450, the photodetector 450 can track the incoming beacon signal 452 without including a separate sensor to track the position of the light source 456.

As discussed herein, a servo actuator 470 can be used for high speed and/or small angle beam tracking. Also, the free space optical communication apparatus 436 can include a gimbal tracking actuator 468 for pointing the optical telescope 444 in the general direction of the ground communication apparatus. In such embodiments, the gimbal tracking actuator 468 can control the larger and/or slower speed movements, while the servo actuator 470 can control the higher speed, smaller movements of the components of the apparatus 436.

In some embodiments, signal positions sensed by the photodetector 450 can be used to control the movement of the gimbal tracking actuator 468 in addition to the servo actuator 470. As stated above with respect to the high speed tracking actuator 470, such movement can be accomplished, for example, by calculating an amount and a direction of movement with a processor and/or logic circuitry based upon the one or more sensed signal positions and communicating the movement to the high speed and/or low speed actuators. Such movement can, for instance, be provided as instructions that are executed by the processor and/or logic circuitry to actuate the one or more actuators, in some embodiments.

In addition, the embodiment illustrated in FIG. 4 can include a dedicated two way RF link from the ground communication apparatus to the free space optical communication apparatus 436 to maintain a functional communication link between the apparatus 436 and the ground communication apparatus, and also assist the free space optical communication apparatus 436 when the optical link is interrupted, as discussed herein.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. A free space optical communication system, comprising:
   a single lens optical telescope with one focal plane, including an intervening beam splitter for accepting and directing a beacon signal from a ground communication apparatus to a photodetector, where the beacon signal is directed by the intervening beam splitter to the photodetector before converging at the one focal plane of the single lens optical telescope;
   a low mass light source for emitting a light beam toward a source of the beacon signal, where the light beam includes a signal to be transmitted; and
   a high speed tracking actuator coupled to the low mass light source for moving the low mass light source to maintain the light beam in a direction toward the source of the beacon signal transmitted from the ground communication apparatus.

2. The system of claim 1, where the high speed tracking actuator is a servo actuator movable in two dimensions.

3. The system of claim 1, where the low mass light source is an optical fiber.

4. The system of claim 3, where the optical fiber is positioned adjacent the single lens optical telescope at the one focal plane of the single lens optical telescope.

5. The system of claim 1, where the beam splitter is stationary.

6. The system of claim 1, where the high speed tracking actuator is further coupled to the beam splitter, photodetector, and low mass light source for moving the beam splitter, photodetector, and the low mass light source to maintain the light beam in a direction toward the source of the beacon signal transmitted from the ground communication apparatus.

7. The system of claim 1, further including a radio frequency communication link used to direct the beacon signal to a position of an unmanned aerial vehicle (UAV).

8. A free space optical communication apparatus, comprising:
   a single lens optical telescope with one focal plane, including an intervening beam splitter for accepting and directing a beacon signal to a photodetector, where the beacon signal is directed by the intervening beam splitter to the photodetector in at the one focal plane of the single lens optical telescope;
   a low mass optical fiber positioned adjacent the single lens optical telescope at the one focal plane of the single lens optical telescope for emitting a light beam including a signal to be transmitted;
   a high speed tracking servo actuator movable in two dimensions coupled to the low mass optical fiber for moving the low mass optical fiber in the one focal plane to point the light beam in a number of directions; and
   a control system for driving the servo actuator based on the beacon signal to maintain the light beam in a direction toward the source of the beacon signal.

9. The apparatus of claim 8, further including a sensor for sensing a location of the low mass optical fiber.

10. The apparatus of claim 8, where the free space optical communication apparatus is mounted to an unmanned aerial vehicle (UAV).

11. The apparatus of claim 8, where the free space optical communication apparatus has high mass relative to the low mass optical fiber and is included in a gimbal tracking actuator.

12. The apparatus of claim 11, where the gimbal tracking actuator is a low speed gimbal tracking actuator movable in two dimensions.

13. A method of providing free space optical communication, comprising:
   receiving an incoming beacon signal from a ground communication apparatus using a single lens optical telescope with one focal plane;
   focusing the incoming beacon signal at a photodetector of a free space optical communication apparatus using an intervening beam splitter, where the beacon signal is directed by the intervening beam splitter to the photodetector before converging at the one focal plane of the single lens optical telescope;
   moving a transmitting low mass light source adjacent an optical telescope at the one focal plane of the single lens optical telescope in an unmanned aerial vehicle based on a position of the incoming beacon signal received; and
   transmitting a light beam directed toward a source of the incoming beacon signal, where the light beam includes a signal to be transmitted.

14. The method of claim 13, where moving the transmitting low mass light source adjacent the optical telescope includes moving the transmitting low mass light source in at least two dimensions at the one focal plane of the single lens optical telescope.

15. The method of claim 14, including:
where the photodetector senses a position of the incoming beacon signal received;
locating a position of the transmitting light source;
generating correction information, where the correction information is a difference between the position of the transmitting light source and the position of the incoming beacon signal received; and
using a RF link to direct a UAV to a position where a last free space optical communication was transmitted.

16. The method of claim 15, where moving the transmitting low mass light source is based on the correction information.

17. The method of claim 15, where the correction information provides correction information for at least two dimensions.

18. The method of claim 13, including:
where the photodetector senses the position of the incoming beacon signal received; and
generating correction information, where the correction information is a difference between a predetermined reference position and the position of the incoming beacon signal received.

19. The method of claim 18, where the single lens optical telescope includes the beam splitter for focusing the beacon signal at the photodetector, and the low mass light source is coupled to the beam splitter and the photodetector.

20. The method of claim 19, where the method includes moving the low mass light source, the beam splitter, and the photodetector in unison.

21. The method of claim 20, where moving the low mass light source, the beam splitter, and the photodetector is based on the correction information.

22. The method of claim 18, where the correction information provides correction information for at least two dimensions.

* * * * *